April 19, 1966  J. F. SHARP  3,246,456
AIR FILTER ASSEMBLY WITH REMOVABLE FILTER ELEMENTS
Filed April 29, 1963  2 Sheets-Sheet 1

INVENTOR.
JOSEPH F. SHARP
BY
Lyon Lyon
ATTORNEYS.

April 19, 1966 J. F. SHARP 3,246,456
AIR FILTER ASSEMBLY WITH REMOVABLE FILTER ELEMENTS
Filed April 29, 1963 2 Sheets-Sheet 2

INVENTOR.
JOSEPH F. SHARP
BY
*Lyon Hyon*
ATTORNEYS.

United States Patent Office 3,246,456
Patented Apr. 19, 1966

3,246,456
AIR FILTER ASSEMBLY WITH REMOVABLE
FILTER ELEMENTS
Joseph F. Sharp, Norwalk, Calif., assignor to Farr Company, El Segundo, Calif., a corporation of California
Filed Apr. 29, 1963, Ser. No. 276,518
8 Claims. (Cl. 55—481)

This invention relates to an air filter arrangement for air handling units wherein the filtering media must be periodically inspected, maintained and replaced and, in particular, this invention relates to such an arrangement wherein the filtering media may be removed laterally with respect to the direction of air flow therethrough.

There are numerous air handling systems employing air filters of the type that have replaceable filtering media. Periodically this filtering media must be inspected and maintained or replaced to produce the desired air filtering characteristics. In air handling systems having a large air flow capacity the air filter is generally comprised of a plurality of individual filter units or cartridges removably mounted in a single housing to form a single large filter.

One of the prime reasons for providing a plurality of filter elements that are individually removable rather than a single large element is the fact that the overwhelming size of a single element would make its removal impossible without the aid of a crane or the like which is not generally available. For example, many filter elements employ a permanent superstructure such as a metal frame which supports the replaceable filter media and such metal frame is of substantial weight due to the rigidity required of the frame. Thus, the individual filter elements are usually of a size and weight that can be manually manipulated for removal and refitting also taking into consideration the inconvenient locations of many filter installations.

Many of these heretofore conventional air filter installations required removal and refitting of the individual filter elements through the front or rear of the air handling system or even require access to both the inlet and outlet sides of the filter elements. However, there are numerous situations where it is undesirable to provide access to the filtering elements through the inlet, outlet or both inlet and outlet of the system such as due to other equipment that is provided at the inlet and outlet and which thereby obstructs ready access to the filter elements. Further, the inlet or outlet may be located or desirably located at a position not easily accessible by a workman.

Accordingly, by this invention there is provided a gas filtering assembly having a plurality of individually removable filtering elements wherein such filtering elements are removable laterally from the assembly without requiring access through the inlet or outlet of the assembly and no individual effort is required to sealably mount each individual filtering element in the assembly.

An object of this invention is to provide a novel form of air filtering assembly comprised of a plurality of individual removable filtering units wherein the filtering units are positioned in horizontal rows and slidable laterally in such rows for removal and replacement.

Another object of this invention is to provide an air filtering assembly having laterally removable filtering units wherein each filtering unit sealably engages each laterally adjacent filtering unit and end wall of the assembly to form a sealed filter assembly preventing the inadvertent passage of unfiltered air and installation of the filtering units does not require individual mounting and sealing of the filtering units.

A further object of this invention is to provide a filter assembly arrangement having a plurality of laterally removable filter elements wherein such elements are supported on vertically spaced rails extending laterally. A still further object of this invention is to provide such an assembly having a novel arrangement of means for sealing between the rails and the filtering elements without such means supporting the weight of the filtering elements. Still another object of this invention is to provide such a novel arrangement of sealing means wherein the normal flow of air through the filtering elements tends to increase the effectiveness of such sealing means.

Another and more detailed object is to provide a filter assembly with a housing and removable filter elements wherein horizontal rails are provided in the housing for supporting the filter elements and such rails comprise an integral unit combining sealing means for engaging the elements, sufficient structural strength and rigidity for supporting the elements, and convenient and versatile means for mounting the rails in various sizes and structural arrangement of housings.

Other and more detailed objects and advantages of this invention will appear from the following description and the accompanying drawings.

Figures 1, 2:
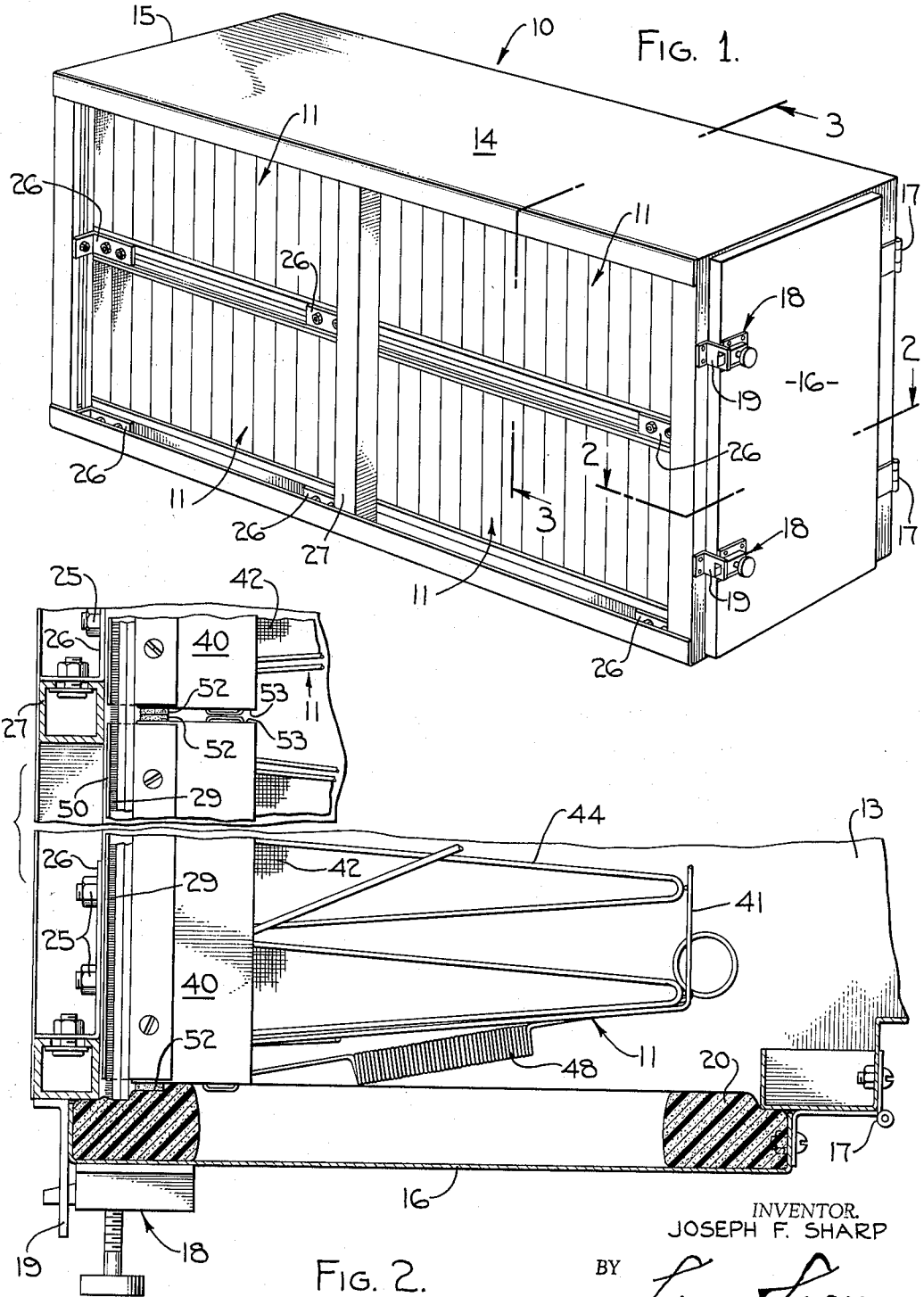
FIGURE 1 is a perspective view of the filter assembly of this invention.
FIGURE 2 is a fragmentary sectional plan view taken substantially on the line 2—2 shown in FIGURE 1 and in the precise vertical location illustrated by line 2—2 shown in FIGURE 3.

Referring now to the drawings, the filter assembly of this invention is comprised of a housing, generally designated 10, and a plurality of individual filter elements, generally designated 11. In the particular embodiment illustrated in FIGURE 1, there are four filter elements 11 shown as positioned in two horizontal rows one above the other of two filter elements each. However, it is to be understood and will be readily apparent from the following detailed description that more or fewer horizontal rows may be provided and more or fewer filter elements provided in each row by merely providing a housing 10 of the appropriate size and having an appropriate duplication of the necessary components thereof. In an air handling installation housing 10 is mounted in the desired location with open front 12 forming the upstream side or inlet for the air that is to be filtered.

Figure 3:
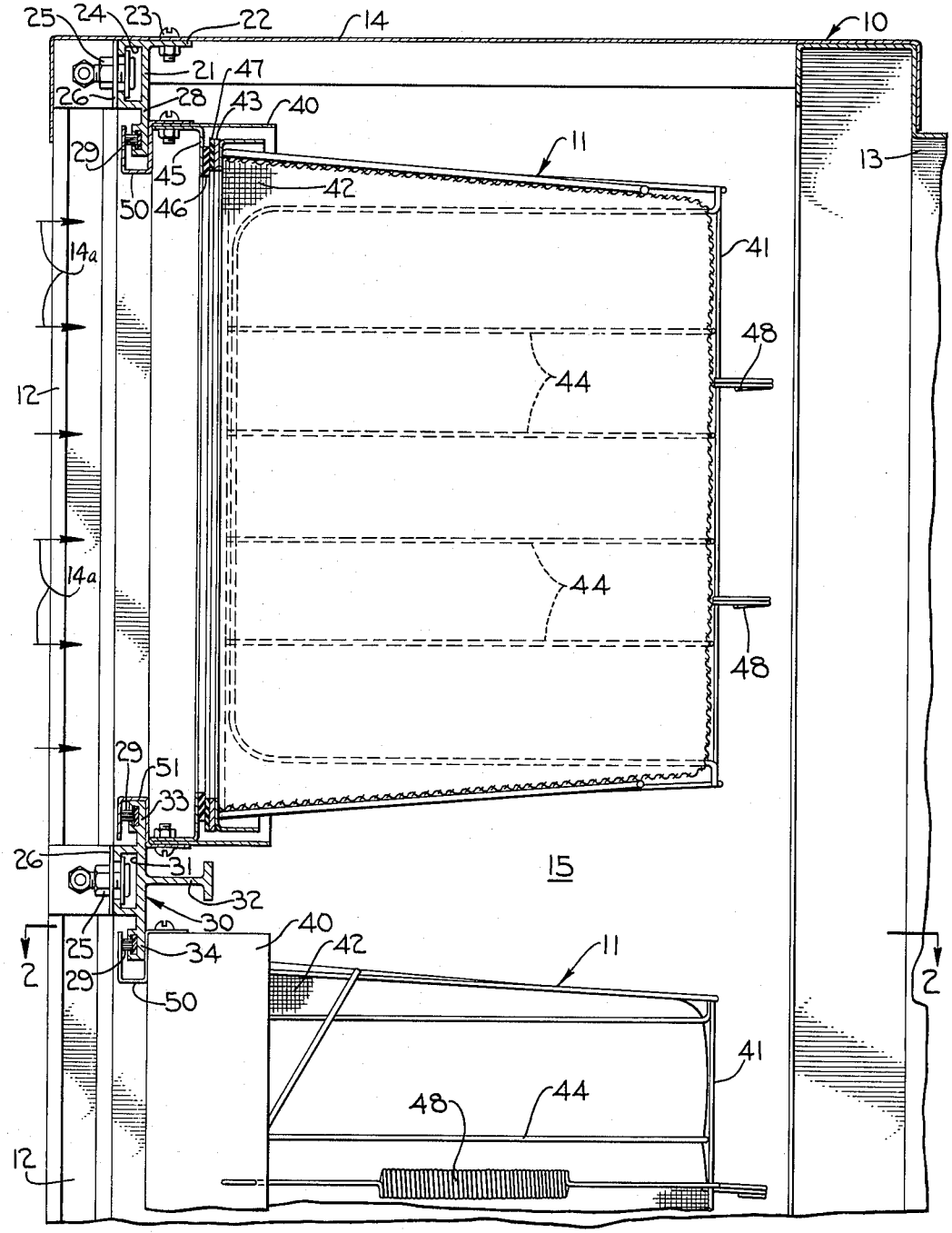
FIGURE 3 is a fragmentary sectional elevation view taken substantially on the line 3—3 shown in FIGURE 1.

The front 12 and rear 13 of housing 10 are open for permitting air to flow through the housing from front to rear in the direction of arrows 14a illustrated in FIGURE 3. The top 14 and bottom (not numbered) of housing 10 are solid walls. End walls 15 of housing 10 are closed and one or both of the end walls 15 are provided with a door 16. Door 16 may be of any convenient design for closing an opening in end wall 15 that is substantially the size of the end wall. Door 16 is hinged to housing 10 by hinges 17 and is releasably secured in the closed position by latches 18 appropriately engaging brackets 19 on housing 10. The inner periphery of door 16 is provided with a seal 20 of preferably compressible material such as foam rubber or plastic for sealably engaging the periphery of the opening in end wall 15 and for engaging the ends of the filter elements 11 positioned adjacent the door.

Referring now more particularly to FIGURE 3, a rail 21 is mounted on the inside of top 14 of the housing and extends laterally the width of the housing between end walls 15. Rail 21 is preferably an extruded member, such as extruded aluminum, having a shape with a plate 22 for slidably securing to top 14 by means of fastener 23 and a T-slot 24 adapted to receive nut and bolt fasteners 25. The fasteners 25 serve to secure the rail 21 to brackets 26 provided at appropriate locations along the rail to produce adequate structural support for the rail. For example, a column 27 may extend vertically between the top and bottom of housing 10 at the front 12 and a bracket 26 may be secured to the column. Column 27 is preferably positioned adjacent the juncture location between two filtering elements 11. Rail 21 is provided with a downwardly extending flange 28 having a forwardly facing T-slot for accommodating a sealing member 29 extending substantially the entire lateral width of housing 10 between end walls 15. Sealing member 29 extends outwardly from flange 28 toward front 12 of the housing 10. Sealing member 29 may be of any convenient type for forming a durable air tight seal and permitting sliding movement of a surface relative thereto such as conventional bristle seals with plastic or nylon fins within the bristles or conventional foam plastic.

A second rail substantially identical to rail 21 is provided and mounted on the bottom of housing 10 in an inverted position from that shown for rail 21. This bottom rail of course has an upwardly extending flange 28 and forwardly extending sealing member 29. Such bottom rail is also secured to the housing by fasteners 23 and 25 in the manner heretofore described. Such bottom rail is not shown in the fragmentary view of FIGURE 3 due to the size of housing 10 and in fact that an illustration of such bottom rail would be merely repetitious of rail 21.

Between each pair of horizontal rows of filter elements 11, only one such pair of rows being shown in FIGURE 1, a horizontal rail 30 is provided. Rail 30, like rail 21, is preferably an extruded aluminum shape and extends the entire lateral width of the housing 10 between end walls 15. Rail 30 is provided with a T-slot 31 similar to T-slot 24 for accommodating nut and bolt fasteners 25 to secure the rail to brackets 26. Brackets 26 are appropriately mounted on housing 10 at spaced locations therealong such as on column 27 and at end walls 15 for structurally supporting rail 30. Rail 30 is also provided with a structural web 32 extending toward the rear 13 of housing 10 for producing the desired structural rigidity. Rail 30 is provided with an upwardly extending flange 33 and a downwardly extending flange 34 both substantially identical to heretofore described flange 28. Flanges 33 and 34 also support sealing members 29 which extend toward the front 12 of housing 10 the same as heretofore described sealing member 29. Thus, it may be seen that for each horizontal row of filtering elements 11 a pair of horizontally spaced rails are provided having flanges extending toward each other and such flanges support sealing members. Specifically, it may be seen that for the upper row of filtering elements 11 in the illustrated embodiment the upper rail 21 has a downwardly extending flange 28 supporting a sealing member 29 and the lower rail 30 has an upwardly extending flange 33 supporting a sealing member 29.

The filtering elements 11 may be of any conventional type but in order to obtain the full benefits of the assembly of this invention which permit ready and easy removal and refitting of the filtering elements, it is preferred that the filtering elements 11 be of the type having a reusable frame for supporting a disposable filtering media. One type of such preferred filtering element is illustrated in the drawings and has a frame 40 with a wire basket 41 for supporting a disposable preformed filter media 42. Filter media 42 is comprised of a porous filtering material formed into a plurality of pleats and secured to a cardboard frame 43. The wire basket 41 has a plurality of wires 44 formed to describe wedge shape supports for the pleats of the filter media 42 with the larger and open end of the wedges and pleats facing the front 12 of housing 10. The frame 40 is generally rectangular or square depending on the configuration desired, and has an inwardly extending flange 45 adapted to confront the cardboard frame 43 of the filter media. A sealing member 46 is mounted on flange 45 and is adapted to sealably engage cardboard frame 43 or an optional sealing member 47 mounted on the face of cardboard frame 43. The wire basket 41 sealably confines the cardboard frame 43 between the wire basket and flange 45 of the frame 40 so that any air passing through frame 40 must pass through the filtering media rather than be allowed to bypass the filtering media. The wire basket 41 is releasably secured to frame 40 by any convenient means such as a plurality of tension springs 48 extending from the frame 40 to the wire basket. By releasing springs 48 the wire basket may be removed from frame 40 and the filtering media 42 removed and replaced.

The frame 40 of each filtering element 11 is provided with a pair of U-shaped channel members 50 and 51 on the upper and lower extremities, respectively, of the frame that extend substantially the entire lateral width of the frame. Upper channel member 50 is open in an upward direction while lower channel member 51 is open in a downward direction. Channels 50 and 51 are vertically spaced a distance slightly less than the vertical spacing between the flanges 28 and 33 of rails 21 and 30, respectively, so that the channel members loosely surround the flanges. Thus, the filtering elements 11 may be slid onto the flanges of rails 21 and 30 and are thereby supported within the housing 10. The channel members 50 and 51 are of a width to engage the rear side of the rail flanges and sealably engage the sealing members 29. Thus, air entering the front 12 of the housing in the direction of arrows 14a is prevented from passing over or under the frame 40 by sealing members 29 which, if permittted, would constitute the bypassing of unfiltered air through the housing. It is to be noted that since sealing members 29 project outwardly toward the front rather than toward each other, the weight of filtering element 11 is actually supported by the upper extremity of flange 33 engaging the channel 51 rather than being supported on a sealing member which would induce premature wearing of such sealing member. Further, it is to be noted that since the air passes through housing 10 in the direction of arrows 14a, the filtering elements 11 will be urged toward the rear 13 by this flowing air and thus channels 50 and 51 will be urged toward tighter engagement with the sealing members 29 under operating conditions.

Referring now more particularly to FIGURE 2, a sealing member 52 is secured to each frame 40 along the vertical sides 53 of the frame. Sealing members 52 extend the entire vertical length of the frame 40 and are adapted to sealably engage a like sealing member 52 on an adjacent filtering element 11 or an end wall 15 when adjacent such an end wall. It is also preferred that seal 20 in door 16 be adapted to engage the sealing member 52 adjacent that door. Thus, it may be seen that sealing members 52 provide a seal between adjacent filtering elements 11 and at the end walls 15 without requiring any mechanical attachment between the filtering elements or to the end walls.

The opening exposed by door 16 when open is large enough to accommodate the insertion of the filtering elements 11 with the channels 50 and 51 engaging the appropriate rails to support the filtering element in the housing. When more than one filtering element 11 is provided in a single horizontal row in the housing, the consecutive filtering elements are merely inserted in the same manner and pushed into the housing 10 until the appropriate number have been installed. By providing the housing 10 with the appropriate lateral dimension for the particular number of predetermined sized filtering elements 11, the mere closing of door 16 and securing by latches 18 causes the interengagement of the plurality of vertical sealing members 52 between the filtering elements and any slight variation in dimensions is readily accounted for and "absorbed" in the compressible seal 20 which forces the filtering elements together. Thus, it may be seen that by this invention there has been provided a filtering assembly which permits lateral insertion and removal of a plurality of filtering elements and that such filtering elements are sealed together in a row by seals 52 and sealed to the housing of the assembly by seals 29 to prevent any air that passes through the housing from bypassing the filtering media of the elements. Horizontal rows of filtering elements are sealed with respect to each other by means of a solid, common rail 30 to also prevent air bypass.

Having fully described my invention it is to be understood that I do not wish to be limited to the details herein set forth or to the details illustrated in the drawings, but my invention is of the full scope of the appended claims.

I claim:

1. In a filter assembly, the combination of: a housing having an inlet and an outlet, at least one pair of substantially parallel rails being vertically spaced and extending across the inlet of said housing, a sealing means mounted on and extending the length of each said rail, each said sealing means positioned on said rail in a location spaced away from the vertical extremity of the rail and facing the inlet of the housing, at least one filter element having a frame and filtering media, said frame having a pair of spaced and laterally extending U-shaped channels, each said U-shaped channel open in a direction away from the other said channel for surrounding one of said rails and engaging said sealing means, the lower of said channels engaging the upper extremity of the lower of said pair of rails for supporting said filter element on said rail without supporting the weight of the filter element on said sealing means, and an openable door in said housing at the end of said rails for permitting removal and refitting of said filter element on said rails.

2. In a filter assembly, the combination of: a housing having an inlet and outlet, at least one pair of substantially parallel rails being vertically spaced and extending generally horizontal across the inlet of said housing, a sealing means mounted on and extending the length of each said rail, each said sealing means positioned on said rail in a location spaced away from the vertical extremity of the rail and facing the inlet of the housing, at least one filter element having a frame and filtering media, said frame having a pair of vertically spaced and laterally extending U-shaped channels, each said U-shaped channel open in a vertical direction away from the other said channel for surrounding one of said rails and engaging said sealing means, the lower of said channels engaging the upper extremity of the lower of said pair of rails for supporting said filter element on said rail without supporting the weight of the filter element on said sealing means, second sealing means extending vertically and positioned on the lateral extremities of said frame for sealably engaging the housing and adjacent frames, and an openable door in said housing at the end of said rails for permitting removal and refitting of said filter element on said rails.

3. In a filter assembly, the combination of: a housing having an inlet and an outlet, at least one pair of substantially parallel rails being vertically spaced and extending generally horizontal across the inlet of said housing, each rail having a flange extending toward the other rail of said pair of rails, a sealing means mounted on and extending the length of each said flange, each said sealing means positioned on said flange in a location spaced away from the vertical extremity of the flange and facing said inlet, a plurality of filter elements removably mounted in said housing, each said filter element having a generally rectangular frame and a filtering media positioned rearwardly of said frame, said frame having a pair of vertically spaced and laterally extending U-shaped channels, each said U-shaped channel open in a vertical direction away from the other said channel of said pair of channels, each said channel surrounding one of said flanges and engaging said sealing means, the lower of said channels engaging the upper extremity of the flange of the lower of said pair of rails for supporting said filter element without supporting the weight of the filter element on said sealing means, at least two of said plurality of filter elements positioned side by side within said housing in a horizontal row, second sealing means extending vertically and positioned on the lateral extremities of each said frame for sealably engaging the housing and adjacent frames, and an openable door in said housing at the end of said rails for permitting removal and refitting of said filter element on said rails.

4. In a filter assembly, the combination of: a housing having an inlet and an outlet, at least one pair of substantially parallel rails being vertically spaced and extending generally horizontal across the inlet of said housing, each rail having a flange extending toward the other rail of said pair of rails, a sealing means mounted on and extending the length of each said flange, each said sealing means positioned on said flange in a location spaced away from the vertical extremity of the flange and facing said inlet, a plurality of filter elements removably mounted in said housing, each said filter element having a generally rectangular frame and a filtering media positioned rearwardly of said frame, said frame having a pair of vertically spaced and laterally extending U-shaped channels, each said U-shaped channel open in a vertical direction away from the other said channel of said pair of channels, each said channel surrounding one of said flanges and engaging said sealing means, the lower of said channels engaging the upper extremity of the flange of the lower of said pair of rails for supporting said filter element without supporting the weight of the filter element on said sealing means, at least two of said plurality of filter elements positioned side by side within said housing, second sealing means extending vertically and positioned on the lateral extremities of each said frame for sealably engaging the like second sealing means on the adjacent frames in the horizontal row, said second sealing means positioned on said frames near said channels, an openable door in said housing at the end of said rails for permitting removal and refitting of said filter element on said rails, and said door having compressible sealing means on the inside thereof for engaging the said frame adjacent the door and resiliently urging that frame toward the frames in that horizontal row.

5. In a filter assembly, the combination of: a housing and a plurality of filter elements removably mounted in said housing, said housing having an open front and back and a closed top and bottom, said housing having closed end walls with at least one end wall having an openable door, at least one pair of substantially parallel rails being vertically spaced and extending from end wall to end wall in said housing near said open front, the uppermost rail sealed with said top, the lowermost rail sealed with said bottom, each rail having a flange extending toward the other rail of said pair of rails, a sealing means mounted on and extending the length of each said flange, each said sealing means positioned on said flange in a location spaced away from the vertical extremity of the flange and facing said open front, each said filter element having a generally rectangular frame and a filtering media positioned rearwardly of said frame, said frame having a pair of vertically spaced and laterally extending U-shaped channels, each said U-shaped channel open in a vertical direction away from the other said channel of said pair of channels, each said channel surrounding one of said flanges and engaging said sealing means, the lower of said channels engaging the upper extremity of the flange of the lower of said pair of rails for supporting said filter element without supporting the weight of the filter element on said sealing means, said plurality of filter elements positioned side by side within said housing from end wall to end wall, and second sealing means extending vertically and positioned on the lateral extremities of each said frame for sealably engaging the end walls and adjacent frames whereby fluid entering the front of said housing passes through each said frame to and through said filtering media and out the back of said housing.

6. In a filter assembly, the combination of: a housing and a plurality of filter elements removably mounted in said housing, said housing having an open front and back and a closed top and bottom, said housing having closed end walls with at least one end wall having an openable door, a plurality of spaced pairs of rails, the rails of each said pair of rails being substantially parallel and vertically spaced from each other, each said rail extending from end wall to end wall in said housing and positioned near said open front, the uppermost rail sealed with said top, the lowermost rail sealed with said bottom, the adjacent rails of each two vertically adjacent pairs of spaced rails comprised of a single integral member, each rail having a flange extending toward the other rail of said pair of rails, a sealing means mounted on and extending the length of each said flange, each said sealing means positioned on said flange in a location spaced away from the vertical extremity of the flange and facing said open front, each said filter element having a generally rectangular frame and a filtering media positioned rearwardly of said frame, said frame having a pair of vertically spaced and laterally extending U-shaped channels, each said U-shaped channel open in a vertical direction away from the other said channel of said pair of channels, each said channel surrounding one of said flanges and engaging said sealing means, the lower of said channels engaging the upper extremity of the flange of the lower of said pair of rails for supporting said filter element without supporting the weight of the filter element on said sealing means, said plurality of filter elements positioned side by side within said housing from end wall to end wall, and second sealing means extending vertically and positioned on the lateral extremities of each said frame for sealably engaging the end walls and adjacent frames whereby fluid entering the front of said housing passes through each said frame to and through said filtering media and out the back of said housing.

7. In a filter assembly, the combination of: a housing and a plurality of filter elements removably mounted in said housing, said housing having an open front and back and a closed top and bottom, said housing having closed end walls with at least one end wall having an openable door, at least one pair of substantially parallel rails being vertically spaced and extending from end wall to end wall in said housing near said open front, the uppermost rail sealed with said top, the lowermost rail sealed with said bottom, each rail having a flange extending toward the other rail of said pair of rails, a sealing means mounted on and extending the length of each said flange, each said sealing means positioned on said flange in a location spaced away from the vertical extremity of the flange and facing said open front, each said filter element having a generally rectangular frame and a filtering media positioned rearwardly of said frame, said frame having a pair of vertically spaced and laterally extending U-shaped channels, each said U-shaped channel open in a vertical direction away from the other said channel of said pair of channels, each said channel surrounding one of said flanges and engaging said sealing means, the lower of said channels engaging the upper extremity of the flange of the lower of said pair of rails for supporting said filter element without supporting the weight of the filter element on said sealing means said plurality of filter elements positioned side by side within said housing from end wall to end wall, second sealing means extending vertically and positioned on the lateral extremities of each said frame for sealably engaging the end walls and adjacent frames whereby fluid entering the front of said housing passes through each said frame to and through said filtering media and out the back of said housing, and compressible means on the inside of said door for urging said frames in a horizontal direction upon closing said door to cause said second sealing means to form the desired seal.

8. In a filter assembly, the combination of: a housing and a plurality of filter elements removably mounted in said housing, said housing having an open front and back and a closed top and bottom, said housing having closed end walls with at least one end wall having an openable door, a plurality of spaced pairs of rails, the rails of each said pair of rails being substantially parallel and vertically spaced from each other, each said rail extending from end wall to end wall in said housing and positioned near said open front, the uppermost rail sealed with said top, the lowermost rail sealed with said bottom, the adjacent rails of each two vertically adjacent pairs of spaced rails comprised of a single integral member, said rails having a longitudinally extending T-slot on the front and an integral reinforcing web on the rear, a plurality of nut and bolt fasteners for cooperating with said T-slot and securing said rails to said housing, each rail having a flange extending toward the other rail of said pair of rails, a sealing means mounted on and extending the length of each said flange and facing said open front, each said filter element having a generally rectangular frame and a filtering media positioned rearwardly of said frame, said frame having a pair of vertically spaced and laterally extending U-shaped channels, each said U-shaped channel open in a vertical direction away from the other said channel of said pair of channels, each said channel surrounding one of said flanges and engaging said sealing means, the lower of said channels engaging the upper extremity of the flange of the lower of said pair of rails for supporting said filter element, said plurality of filter elements positioned side by side within said housing from end wall to end wall, and second sealing means extending vertically and positioned on the lateral extremities of each said frame for sealably engaging the end walls and adjacent frame whereby fluid entering the front of said housing passes through each said frame to and through said filtering media and out the back of said housing.

References Cited by the Examiner

UNITED STATES PATENTS

| | | | |
|---|---|---|---|
| 1,952,989 | 3/1934 | Joseph | 55—485 X |
| 2,081,553 | 5/1937 | Neeson | 55—481 X |
| 2,107,653 | 2/1938 | Strobell | 55—483 X |
| 2,655,091 | 10/1953 | Geiger | 55—481 X |
| 2,792,906 | 5/1957 | Evans | 55—502 |
| 2,908,348 | 10/1959 | Rivers et al. | 55—484 X |
| 2,935,157 | 5/1960 | First | 55—502 X |

FOREIGN PATENTS

| | | |
|---|---|---|
| 575,846 | 4/1924 | France. |
| 748,901 | 5/1956 | Great Britain. |
| 224,404 | 2/1943 | Switzerland. |

ROBERT F. BURNETT, *Primary Examiner.*